United States Patent
Wu et al.

(10) Patent No.: US 7,564,927 B2
(45) Date of Patent: Jul. 21, 2009

(54) BAND AVERAGING CIRCUIT AND RELATED METHOD FOR CARRIER FREQUENCY OFFSET ESTIMATION IN A MULTI-BAND MULTI-CARRIER COMMUNICATION SYSTEM

(75) Inventors: Kuo-Ming Wu, Nan-Tou Hsien (TW); Der-Zheng Liu, Tai-Nan (TW)

(73) Assignee: Realtek Semiconductor Corp., HsinChu (TW)

( * ) Notice: Subject to any disclaimer, the term of this patent is extended or adjusted under 35 U.S.C. 154(b) by 606 days.

(21) Appl. No.: 11/162,831

(22) Filed: Sep. 25, 2005

(65) Prior Publication Data

US 2006/0067430 A1  Mar. 30, 2006

(30) Foreign Application Priority Data

Sep. 29, 2004  (TW) .............................. 93129467 A

(51) Int. Cl.
*H04L 27/00* (2006.01)
(52) U.S. Cl. ...................................... 375/326; 375/267
(58) Field of Classification Search ................. 375/260, 375/267, 316, 324, 326
See application file for complete search history.

(56) References Cited

U.S. PATENT DOCUMENTS

| | | | |
|---|---|---|---|
| 7,072,783 B2 * | 7/2006 | Makhlouf et al. | 702/69 |
| 7,116,727 B2 * | 10/2006 | Chen | 375/316 |
| 7,139,340 B2 * | 11/2006 | Scarpa | 375/344 |
| 7,310,302 B2 * | 12/2007 | Cimini et al. | 370/203 |
| 2004/0218695 A1 * | 11/2004 | Koga et al. | 375/326 |

* cited by examiner

*Primary Examiner*—Chieh M. Fan
*Assistant Examiner*—Freshteh N Aghdam
(74) *Attorney, Agent, or Firm*—Winston Hsu

(57) ABSTRACT

A band averaging circuit and a related method for estimating a carrier frequency offset are applied in a multi-band multi-carrier communication system. A packet of the multi-band multi-carrier communication system is transmitted via a plurality of carriers. The band averaging circuit includes a frequency offset estimation unit for generating a plurality of carrier frequency offset ratios corresponding to the carriers according to a received packet; and a frequency offset adjustment circuit coupled to the frequency offset estimation unit for calculating a weighted average carrier frequency offset ratio according to carrier frequency offset ratios and comparison results of the carrier frequency offset ratios, and also for calculating a carrier frequency offset of each carrier according to the weighted average carrier frequency offset ratio and a center frequency of the carrier.

17 Claims, 2 Drawing Sheets

BAND AVERAGING CIRCUIT AND RELATED METHOD FOR CARRIER FREQUENCY OFFSET ESTIMATION IN A MULTI-BAND MULTI-CARRIER COMMUNICATION SYSTEM

BACKGROUND OF THE INVENTION

1. Field of the Invention

The present invention relates to a circuit and a method for estimating a carrier frequency offset, and more specifically, to a band averaging circuit and a related method for estimating a carrier frequency offset in a multi-band and multi-carrier communication system.

2. Description of the Prior Art

In general, data to be transmitted is modulated by a carrier in a communication system to ensure the communication quality of a transmitter and a receiver. In the communication system, the data is modulated by the carrier of a specific frequency at the transmitter utilizing a local oscillator, the modulated data is transmitted through a channel, and the modulated data is received by the receiver. The receiver must utilize a local oscillator to demodulate the received data before reading. However, practically, even two identical oscillators cannot generate oscillating signals of completely the same frequency and therefore there is a slight difference between the original data and the demodulated data.

For example, a multi-band multi-carrier communication system transmits a packet using several different carriers, i.e. three carriers, and the packet received at the receiver must be respectively demodulated according to the frequencies of the three carriers to obtain the original packet. To ensure the frequencies of the carriers utilized at the transmitter and the receiver are identical, a carrier frequency offset estimation circuit is utilized for estimating and compensating the frequency offset between the carriers utilized by the transmitter and the receiver. Ideally, a ratio of a carrier frequency offset to a center frequency of the carrier is equal to a specific value, so most of the conventional methods estimate the ratio of the frequency offset of each carrier to the frequency of the each carrier to generate the first, second, and third carrier frequency offset ratios. The carrier frequency offset of the each carrier is then obtained according to an average value of the first, second and third carrier frequency offset ratios. The above-mentioned computational operation is in the following equation:

$$\gamma_{avg} = \frac{1}{3} \cdot \left( \frac{\Delta \hat{f}_1}{f_{c1}} + \frac{\Delta \hat{f}_2}{f_{c2}} + \frac{\Delta \hat{f}_3}{f_{c3}} \right) \qquad \text{Equation (1)}$$

$\gamma_{avg}$ denotes the average carrier frequency offset ratio, $f_{c1}$ to $f_{c3}$ denote center frequencies of the first, the second and the third carriers, respectively, and $\Delta \hat{f}_1, \Delta \hat{f}_2, \Delta \hat{f}_3$ denote the carrier frequency offsets of the three carriers, respectively. Because estimation results of the carrier frequency offset ratios may not be accurate, it is necessary to average the carrier frequency offset ratios in order to obtain an average carrier frequency offset ratio $\gamma_{avg}$, which will better approximate the above-mentioned specific value. Then, a carrier frequency offset of each carrier is generated using the average carrier frequency offset ratio $\gamma_{avg}$. The above-mentioned computational operations for obtaining the carrier frequency offsets are provided in the following equation:

$$\Delta \hat{f}_1 = \gamma_{avg} f_{c1} \qquad \text{Equation (2)}$$

$$\Delta \hat{f}_2 = \gamma_{avg} f_{c2} \qquad \text{Equation (3)}$$

$$\Delta \hat{f}_3 = \gamma_{avg} f_{c3} \qquad \text{Equation (4)}$$

In equations (2) to (4), $\Delta \hat{f}_1$, $\Delta \hat{f}_2$ and $\Delta \hat{f}_3$ denote carrier frequency offsets calculated according to the average carrier frequency offset ratio $\gamma_{avg}$, respectively, and the carrier frequency offsets $\Delta \hat{f}_1$, $\Delta \hat{f}_2$ and $\Delta \hat{f}_3$ are utilized to compensate the local oscillating signal of the receiver.

By using the above-mentioned equation (1), a more accurate carrier frequency offset can be obtained. However, when estimating any of the first, the second and the third carrier frequency offset ratios, if a serious mistake occurs, the accuracy of the average carrier frequency offset ratio $\gamma_{avg}$ will be affected seriously by the mistake accordingly.

SUMMARY OF THE INVENTION

One of the objectives of the claimed invention is therefore to provide a band averaging circuit and a related method for estimating a carrier frequency offset applied in a multi-band multi-carrier communication system to solve the above-mentioned problem.

According to the claimed invention, a band averaging circuit for estimating a carrier frequency offset is disclosed. The band averaging circuit is applied in a multi-band multi-carrier communication system. A packet of the multi-band multi-carrier communication system is transmitted via a plurality of carriers. Each carrier has a center frequency, and the band averaging circuit is utilized for estimating a carrier frequency offset of each carrier. The band averaging circuit comprises: a frequency offset estimation unit for generating a plurality of carrier frequency offset ratios corresponding to the plurality of carriers, according to a received packet; and a frequency offset adjustment circuit coupled to the frequency offset estimation unit for calculating a weighted average carrier frequency offset ratio according to the carrier frequency offset ratios and comparison results of the carrier frequency offset ratios, and also for calculating a carrier frequency offset of each carrier according to the weighted average carrier frequency offset ratio and a center frequency of the carrier.

In addition, the claimed invention provides a method of band averaging applied in a multi-band multi-carrier communication system. A packet of the multi-band multi-carrier communication system is transmitted via a plurality of carriers. Each of the carriers has a center frequency, and the method is utilized for estimating a carrier frequency offset of each carrier. The method comprises: generating a plurality of carrier frequency offset ratios corresponding to the plurality of carriers, according to a received packet; comparing the carrier frequency offset ratios, and calculating a weighted average carrier frequency offset ratio according to the carrier frequency offset ratios and comparison results of the carrier frequency offset ratios; and calculating a carrier frequency offset of each carrier according to the weighted average carrier frequency offset ratio and a center frequency of the carrier.

In summary, the band averaging circuit according to the claimed invention performs a weighted averaging operation on the first, the second and the third carrier frequency offset ratios using a frequency offset adjustment circuit according to the comparison results of the three carrier frequency offset ratios, and further determines the carrier frequency offsets of the first, the second and the third carriers. In this way, the accuracy of the carrier frequency offsets can be improved. Therefore, the carrier frequency offsets generated using the method according to the claimed invention can be utilized for compensating the local oscillating signal to efficiently decrease inter carrier interferences (ICI) in the multi-band multi-carrier communication system. That is, the band averaging circuit and the related method according to the claimed invention are capable of improving the quality of the received signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
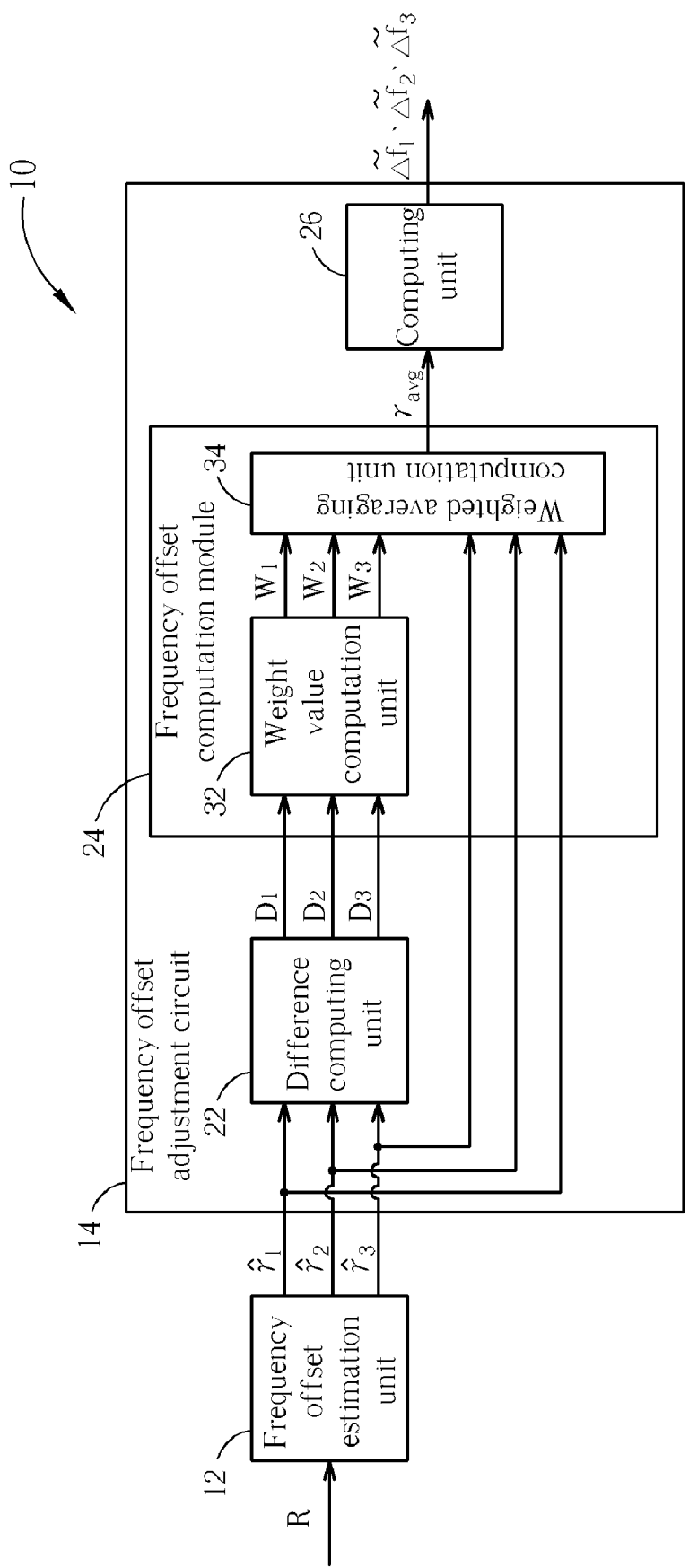
FIG. 1 is a functional block diagram of a band averaging circuit according to an embodiment of the present invention.

Please refer to FIG. 1. FIG. 1 is a functional block diagram of a band averaging circuit 10 according to an embodiment of the present invention. The band averaging circuit 10 is utilized for estimating a carrier frequency offset in a multi-band multi-carrier communication system. As shown in FIG. 1, the band averaging circuit 10 comprises a frequency offset estimation unit 12 and a frequency offset adjustment circuit 14. The frequency offset estimation unit 12 is utilized for generating a plurality of carrier frequency offset ratios, such as a first carrier frequency offset ratio $\hat{\gamma}_1$, a second carrier frequency offset ratio $\hat{\gamma}_2$ and a third carrier frequency offset ratio $\hat{\gamma}_3$ in the present embodiment according to a received packet R. Operations and functions of the frequency offset estimation unit 12 are well known to those of ordinary skill in the art and will not be depicted repeatedly. Next, the frequency offset adjustment circuit 14 is utilized for calculating a first carrier frequency offset $\Delta \hat{f}_1$, a second carrier frequency offset $\Delta \hat{f}_2$ and a third carrier frequency offset $\Delta \hat{f}_3$ according to the three carrier frequency offset ratios $\hat{\gamma}_1$, $\hat{\gamma}_2$, $\hat{\gamma}_3$ and comparison results of the three carrier frequency offset ratios $\hat{\gamma}_1$, $\hat{\gamma}_2$, $\hat{\gamma}_3$. A detailed description of operations of the frequency offset adjustment circuit 14 is described in the following.

As shown in FIG. 1, the frequency offset adjustment circuit 14 comprises a difference computing unit 22, a frequency offset computation module 24 and a computing unit 26. Firstly, the difference computing unit 22 calculates each of the three difference values $D_1$, $D_2$, $D_3$ using two of the three carrier frequency offset ratios $\hat{\gamma}_1$, $\hat{\gamma}_2$, $\hat{\gamma}_3$. The computational operations for calculating the difference values $D_1$, $D_2$, $D_3$ are provided in the following equations (but are not limited to the following equations):

$$D_1 = |\hat{\gamma}_1 - \hat{\gamma}_2| \quad \text{Equation (5)}$$

$$D_2 = |\hat{\gamma}_2 - \hat{\gamma}_3| \quad \text{Equation (6)}$$

$$D_3 = |\hat{\gamma}_3 - \hat{\gamma}_1| \quad \text{Equation (7)}$$

Afterwards, the frequency offset computation module 24 performs a weighted averaging computation on the carrier frequency offset ratios $\hat{\gamma}_1$, $\hat{\gamma}_2$, $\hat{\gamma}_3$ according to the difference values $D_1$, $D_2$, $D_3$ to generate a weighted average carrier frequency offset ratio $\gamma_{avg}$. Finally, the computing unit 26 calculates the carrier frequency offsets $\Delta \hat{f}_1$, $\Delta \hat{f}_2$, $\Delta \hat{f}_3$ respectively corresponding to the first, the second and the third carriers according to the weighted average carrier frequency offset ratio $\gamma_{avg}$ and the center frequencies $f_1$, $f_2$, $f_3$ respectively corresponding to the first, the second and the third carriers. The detailed computational operation of the above-mentioned weighted average carrier frequency offset ratio $\gamma_{avg}$ is described as follows. The computational operations for calculating the carrier frequency offsets $\Delta \hat{f}_1$, $\Delta \hat{f}_2$, $\Delta \hat{f}_3$ are provided in the following equations (but are not limited to the following equations):

$$\Delta \hat{f}_1 = \gamma_{avg} \cdot f_1 \quad \text{Equation (8)}$$

$$\Delta \hat{f}_2 = \gamma_{avg} \cdot f_2 \quad \text{Equation (9)}$$

$$\Delta \hat{f}_3 = \gamma_{avg} \cdot f_3 \quad \text{Equation (10)}$$

In equations (8) to (10), $f_1$, $f_2$ and $f_3$ denote the center frequencies of the first, the second and the third carriers, respectively.

Please refer to FIG. 1. The frequency offset computation module 24 utilized for calculating the weighted average carrier frequency offset ratio $\gamma_{avg}$ comprises a weight value computation unit 32 and a weighted computation averaging unit 34. In the present embodiment, the weight value computation unit 32 determines if each of the difference values $D_1$, $D_2$, $D_3$ is greater than a threshold value, and generates a first weight index $I_1$, a second weight index $I_2$ and a third weight index $I_3$, respectively according to the determination results. In the present embodiment, a value of each of the weight indexes $I_1$, $I_2$, $I_3$ is equal to a logical value "0" or a logical value "1". The computational operations for calculating the weight indexes $I_1$, $I_2$, $I_3$ are provided in the following equations (but are not limited to the following equations):

$$I_i = \begin{cases} 1, & D_i \geq \delta_{th} \cdot S_2 \\ 0, & \text{otherwise} \end{cases}, \text{ wherein} \quad \text{Equation (11)}$$

$$S_2 = D_1 + D_2 + D_3,$$

$$i = 1, 2, 3$$

In equation (11), $\delta_{th} \cdot S_2$ is the above-mentioned threshold value, wherein $\delta_{th}$ is an adjustable system predetermined value, and $S_2$ is the sum of the difference values $D_1$, $D_2$, $D_3$. Hence, in the present embodiment, whether each of the difference values $D_1$, $D_2$, $D_3$ being greater than or equal to the threshold value can be determined according to the logical values corresponding to the weight indexes $I_1$, $I_2$, $I_3$. Please note that it is applicable that the band averaging circuit 10 according to the present invention uses only one threshold value or uses different threshold values to generate the weight indexes $I_1$, $I_2$, $I_3$. Also, the weight indexes $I_1$, $I_2$, $I_3$ are not limited to logical values "0" or "1". Next, the weight value computation unit 32 generates a first weight value $W_1$, a second weight value $W_2$ and a third weight value $W_3$ according to the three weight indexes $I_1$, $I_2$, $I_3$. The computational operations for calculating the weight values $W_1$, $W_2$, $W_3$ are provided in the following equations (but are not limited to the following equations):

$$W_1 = \frac{\overline{I_1} \cdot \overline{I_3}}{\overline{I_1} \cdot \overline{I_3} + \overline{I_1} \cdot \overline{I_2} + \overline{I_2} \cdot \overline{I_3}} \quad \text{Equation (12)}$$

$$W_2 = \frac{\overline{I_1} \cdot \overline{I_2}}{\overline{I_1} \cdot \overline{I_3} + \overline{I_1} \cdot \overline{I_2} + \overline{I_2} \cdot \overline{I_3}} \quad \text{Equation (13)}$$

$$W_3 = \frac{\overline{I_2} \cdot \overline{I_3}}{\overline{I_1} \cdot \overline{I_3} + \overline{I_1} \cdot \overline{I_2} + \overline{I_2} \cdot \overline{I_3}} \quad \text{Equation (14)}$$

It should be noted that when the values corresponding to the weight indexes $I_1$, $I_2$, $I_3$ are adjusted to be values which are not equal to logical values "0" or "1", the equations (12) to

(14) utilized by the weight value computation unit 32 will be adjusted accordingly to normalize the weight values $W_1$, $W_2$, $W_3$.

Finally, the weighted computation averaging unit 34 generates the weighted average carrier frequency offset ratio $\gamma_{avg}$ according to the weight values $W_1$, $W_2$, $W_3$ and the carrier frequency offset ratios $\hat{\gamma}_1$, $\hat{\gamma}_2$, $\hat{\gamma}_3$. The computational operation for calculating the weighted average carrier frequency offset ratio $\gamma_{avg}$ is provided in the following equations (but is not limited to the following equation):

$$\gamma_{avg} = W_1 \cdot \hat{\gamma}_1 + W_2 \cdot \hat{\gamma}_2 + W_3 \cdot \hat{\gamma}_3 \quad \text{Equation (15)}$$

Therefore, when there is an estimation mistake occurring in a process of estimating the first carrier frequency offset ratio $\hat{\gamma}_1$, which means that comparing with the carrier frequency offset ratios $\hat{\gamma}_2$, $\hat{\gamma}_3$, the first carrier frequency offset ratio $\hat{\gamma}_1$ is relatively particularly great or small, the difference values $D_1$, $D_3$ related to the first carrier frequency offset ratio $\hat{\gamma}_1$ are greater than the threshold value $\delta_{th} \cdot S_2$. Hence, the first weight index $I_1$ and the third weight index $I_3$ are set to be equal to the logical value "1", and the second weight index $I_2$ is set to be the logical value "0". Afterwards, according to equations (12) to (14), the values of the weight values $W_1$, $W_2$, $W_3$ can be obtained: the value of the first weight value $W_1$ is equal to 0, and the values of the second weight value $W_2$ and the third weight value $W_3$ are equal to ½. Because the first carrier frequency offset ratio $\hat{\gamma}_1$ gets a wrong value, the weighted computation averaging unit 34 sets the percentage of the weighted average carrier frequency offset ratio corresponding to the first carrier frequency offset ratio $\hat{\gamma}_1$ to be equal to 0, and sets the percentages of the weighted average carrier frequency offset ratios corresponding to the second carrier frequency offset ratio $\hat{\gamma}_2$ and the third carrier frequency offset ratio $\hat{\gamma}_3$ to be ½, according to equation (15).

Figure 2:
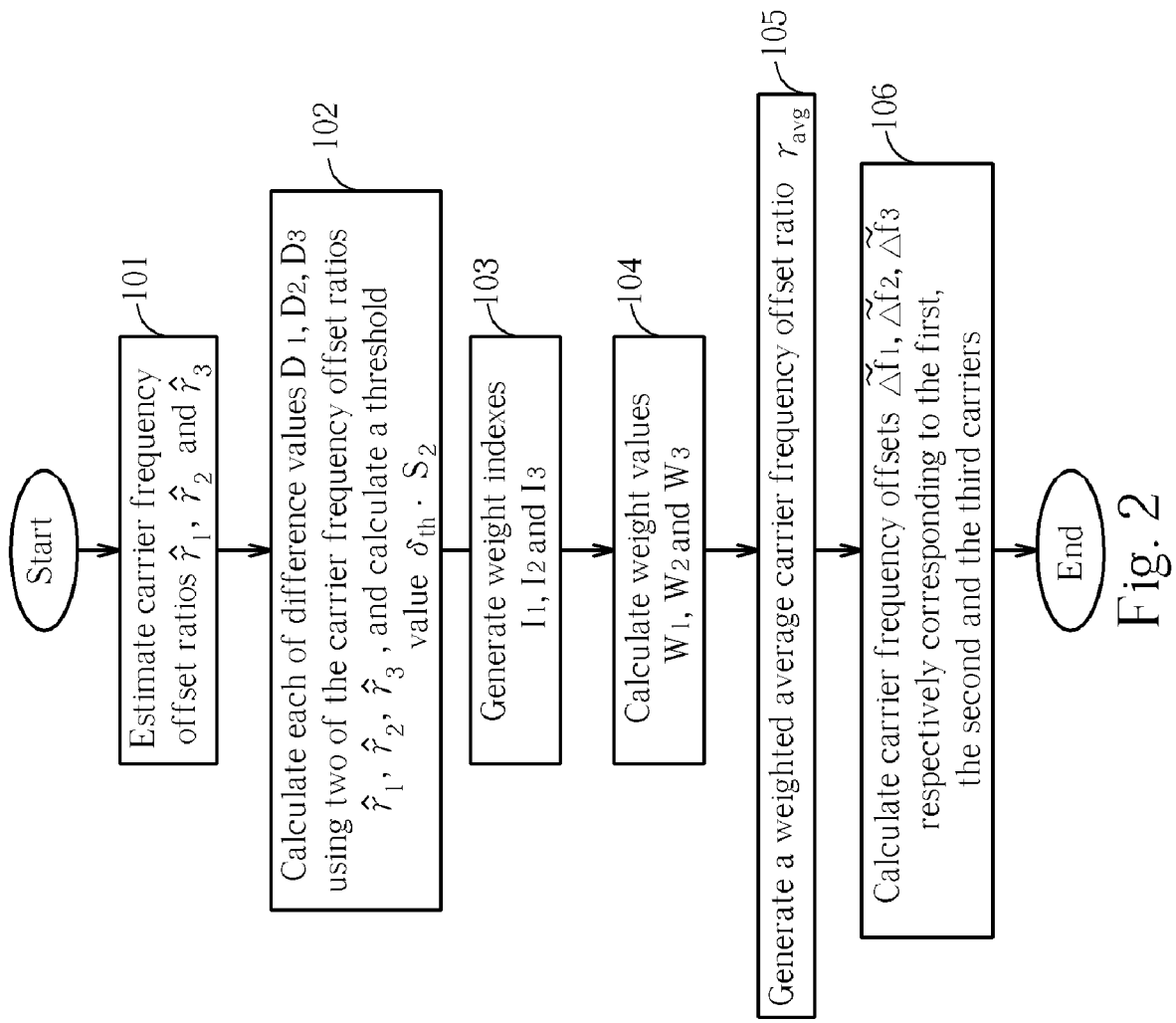
FIG. 2 is a flowchart describing the method performed by the band averaging circuit shown in FIG. 1 according to the embodiment of the present invention.

Please refer to FIG. 2. FIG. 2 is a flowchart describing the method performed by the band averaging circuit 10 shown in FIG. 1 according to the embodiment of the present invention. As shown in FIG. 2, the steps of estimating the carrier frequency offsets $\Delta \hat{f}_1$, $\Delta \hat{f}_2$, $\Delta \hat{f}_3$ respectively corresponding to the first, the second and the third carriers in the multi-band multi-carrier communication system are described in the following steps:

Step 101: Preliminarily estimate the first carrier frequency offset ratio $\hat{\gamma}_1$, the second carrier frequency offset ratio $\hat{\gamma}_2$ and the third carrier frequency offset ratio $\hat{\gamma}_3$.

Step 102: Calculate each of the difference values $D_1$, $D_2$, $D_3$ using two of the carrier frequency offset ratios $\hat{\gamma}_1$, $\hat{\gamma}_2$, $\hat{\gamma}_3$, and calculate the threshold value $\delta_{th} \cdot S_2$.

Step 103: Compare each of the difference values $D_1$, $D_2$, $D_3$ with the threshold value $\delta_{th} \cdot S_2$ and generate the first weight index $I_1$, the second weight index $I_2$ and the third weight index $I_3$ according to the comparison results.

Step 104: Calculate the first weight value $W_1$, the second weight value $W_2$ and the third weight value $W_3$ according to the weight indexes $I_1$, $I_2$, $I_3$.

Step 105: Generate the weighted average carrier frequency offset ratio $\gamma_{avg}$ according to the weight values $W_1$, $W_2$, $W_3$ and the carrier frequency offset ratios $\hat{\gamma}_1$, $\hat{\gamma}_2$, $\hat{\gamma}_3$.

Step 106: Calculate the carrier frequency offsets $\Delta \hat{f}_1$, $\Delta \hat{f}_2$, $\Delta \hat{f}_3$ respectively corresponding to the first, the second and the third carriers according to the weighted average carrier frequency offset ratio $\gamma_{avg}$ and the center frequencies $f_1$, $f_2$, $f_3$ respectively corresponding to the first, the second and the third carriers.

Please note that the band averaging circuit and the related method according to the present invention can be applied for estimating a plurality of carrier frequency offsets, including estimating three carrier frequency offsets. Also, the computational operations of generating weight indexes or weight values are not limited to the equations utilized in the above-mentioned embodiment. In fact, if using one mechanism, weight values of carriers can be generated using comparison results of carrier frequency offset ratios, and a more accurate carrier frequency offset ratio can be given a greater weight value. This mechanism should also be viewed as a part of the present invention.

In summary, a carrier frequency offset calculated by the band averaging circuit and the related method according to the present invention is more accurate due to utilization of a frequency offset adjustment circuit. Therefore, when compensating a frequency of a carrier of a multi-band multi-carrier communication system using a highly accurate carrier frequency offset, not only can reduce the inter carrier interferences in the multi-band multi-carrier communication system, but also the quality of the received signal can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A band averaging circuit applied in a multi-band multi-carrier communication system, a packet of the multi-band multi-carrier communication system transmitted via a plurality of carriers, each carrier having a center frequency, and the band averaging circuit utilized for generating a carrier frequency offset of each carrier; the band averaging circuit comprising:
   a frequency offset estimation unit for generating a plurality of carrier frequency offset ratios corresponding to the plurality of carriers according to a received packet; and
   a frequency offset adjustment circuit coupled to the frequency offset estimation unit for calculating a weighted average carrier frequency offset ratio according to the carrier frequency offset ratios and comparison results between the carrier frequency offset ratios, and also for calculating the carrier frequency offset of each carrier according to the weighted average carrier frequency offset ratio and the center frequency of each carrier;
   wherein the frequency offset adjustment circuit comprises:
   a difference computing unit for calculating a plurality of difference values between each two of the carrier frequency offset ratios;
   a frequency offset computation module coupled to the difference computing unit for calculating a plurality of weight values according to the plurality of difference values, and for calculating the weighted average carrier frequency offset ratio according to the weight values and the carrier frequency offset ratios, wherein each of the weight values corresponds to each of the carrier frequency offset ratios; and
   a computing unit coupled to the frequency offset computation module for determining the carrier frequency offset of each carrier according to the weighted average carrier frequency offset ratio and the center frequency of the carrier.

2. The band averaging circuit of claim 1, wherein the frequency offset estimation unit calculates the plurality of carrier frequency offsets corresponding to the carriers according to the received packet, and generates the carrier frequency offset ratios according to the corresponding carrier frequency offsets and the center frequencies.

3. The band averaging circuit of claim 1, wherein the frequency offset computation module comprises:
  a weight value computation unit coupled to the difference computing unit for generating the weight values; and
  a weighted computation averaging unit coupled to the difference computing unit and the weight value computation unit for adjusting each of the carrier frequency offset ratios according to the weight value corresponding to the carrier frequency offset ratio, and for generating the weighted average carrier frequency offset ratio according to the corresponding adjusted carrier frequency offset ratios.

4. The band averaging circuit of claim 1, wherein the frequency offset computation module calculates a plurality of weight indexes according to the difference values between the carrier frequency offset ratios, and calculates the weight values according to the weight indexes.

5. The band averaging circuit of claim 4, wherein the frequency offset computation module compares each of the difference values with at least one threshold value, and generates the weight indexes according to the comparison results.

6. The band averaging circuit of claim 5, wherein the threshold value is a functional computation value of the difference values between the carrier frequency offset ratios.

7. The band averaging circuit of claim 1, wherein the frequency offset computation module generates a first weight index when a difference value between two of the carrier frequency offset ratios is equal to or greater than a threshold value, and generates a second weight index when a difference value of two of the carrier frequency offset ratios is less than the threshold value.

8. The band averaging circuit of claim 7, wherein the weight value computation unit calculates the weight values according to the first weight indexes and the second weight indexes.

9. The band averaging circuit of claim 7, wherein the threshold value is a functional computation value of the difference values between the two carrier frequency offset ratios.

10. A method of band averaging applied in a multi-band multi-carrier communication system, a packet of the multi-band multi-carrier communication system transmitted via a plurality of carriers, each of the carriers having a center frequency, and the method utilized for estimating a carrier frequency offset of each carrier; the method comprising:
  generating a plurality of carrier frequency offset ratios corresponding to the plurality of carriers according to a received packet;
  comparing the carrier frequency offset ratios, and calculating a weighted average carrier frequency offset ratio according to the carrier frequency offset ratios and comparison results between the carrier frequency offset ratios; and
  calculating the carrier frequency offset of each carrier according to the weighted average carrier frequency offset ratio and the center frequency of the carrier;
  wherein the step of calculating the weighted average carrier frequency offset ratio further comprises:
  calculating a plurality of difference values between each two carrier frequency offset ratios;
  calculating a plurality of weight values according to the plurality of difference values, wherein each of the weight values corresponds to each of the carrier frequency offset ratios; and
  calculating the weighted average carrier frequency offset ratio according to the weight values.

11. The method of claim 10, wherein the step of generating the carrier frequency offset ratios further comprises:
  calculating the plurality of carrier frequency offsets corresponding to the carriers according to the received packet; and
  generating the carrier frequency offset ratios according to the corresponding carrier frequency offsets and the center frequencies.

12. The method of claim 10, wherein the step of calculating the weighted average carrier frequency offset ratio further comprises:
  adjusting each of the carrier frequency offset ratios according to the corresponding weight value, and generating the weighted average carrier frequency offset ratio according to the corresponding adjusted carrier frequency offset ratios.

13. The method of claim 10, wherein the step of calculating the weight values further comprises:
  calculating a plurality of weight indexes according to the difference values between the carrier frequency offset ratios, and calculating the weight values using the weight indexes.

14. The method of claim 13, wherein the step of calculating the weight indexes further comprises:
  comparing each of the difference values with at least one threshold value, and generating the weight indexes according to the comparison results.

15. The method of claim 14, wherein the threshold value is a functional computation value calculated using the difference values which are calculated using two carrier frequency offset ratios.

16. The method of claim 10, wherein the step of generating the weight values further comprises:
  generating a first weight index when a difference value between each two of the carrier frequency offset ratios is equal to or greater than a threshold value;
  otherwise, generating a second weight index; and
  calculating the weight values according to the first weight indexes and the second weight indexes.

17. The method of claim 16, wherein the threshold value is a functional computation value of the difference values between the two carrier frequency offset ratios.

* * * * *